United States Patent
Glander

(10) Patent No.: US 10,163,353 B2
(45) Date of Patent: Dec. 25, 2018

(54) CONTROL SYSTEM AND METHOD FOR DETERMINING A SAFE LANE CHANGE BY VEHICLES

(71) Applicant: TRW AUTOMOTIVE GMBH, Alfdorf (DE)

(72) Inventor: Karl-Heinz Glander, Monheim (DE)

(73) Assignee: TRW AUTOMOTIVE GmbH (DE)

( * ) Notice: Subject to any disclaimer, the term of this patent is extended or adjusted under 35 U.S.C. 154(b) by 40 days.

(21) Appl. No.: 15/402,452

(22) Filed: Jan. 10, 2017

(65) Prior Publication Data
US 2017/0200371 A1    Jul. 13, 2017

(30) Foreign Application Priority Data
Jan. 11, 2016 (DE) .......................... 10 2016 000 199

(51) Int. Cl.
*G08G 1/16*    (2006.01)
*G05D 1/02*    (2006.01)

(52) U.S. Cl.
CPC ............. *G08G 1/167* (2013.01); *G05D 1/021* (2013.01); *G08G 1/165* (2013.01)

(58) Field of Classification Search
CPC ......... G08G 1/167; G08G 1/165; G05D 1/021
USPC ........................................................ 701/23
See application file for complete search history.

(56) References Cited

U.S. PATENT DOCUMENTS

| | | | |
|---|---|---|---|
| 6,388,565 B1* | 5/2002 | Bernhard | B60Q 9/008 340/435 |
| 2015/0194055 A1* | 7/2015 | Maass | B60W 50/14 340/905 |
| 2015/0321699 A1* | 11/2015 | Rebhan | B60Q 9/00 701/23 |
| 2016/0059858 A1 | 3/2016 | Heinrich et al. | |

* cited by examiner

*Primary Examiner* — Yazan A Soofi
(74) *Attorney, Agent, or Firm* — Tarolli, Sundheim, Covell & Tummino LLP

(57) ABSTRACT

Control system, which is adapted for application in a vehicle and intended to detect following vehicles on the basis of environmental data which are obtained from one or several environmental sensors disposed on the vehicle. The environmental sensors are adapted to provide an electronic controller of the control system with the environmental data which reflect the area in front of, laterally next to and/or behind the vehicle. The control system is at least adapted and intended to detect one or several other vehicles participating in traffic behind the own vehicle with the environmental sensors. A lane associated with each other vehicle, in which the other vehicle(s) drive(s), is detected. A traffic density of the own lane and/or of at least one adjacent lane by the other vehicle(s) is determined. On the basis of the determined traffic density (i) an indication on a safe or unsafe lane change to a specific of the at least one adjacent lane is output and/or (ii) an autonomous lane change to the specific of the at least one adjacent lane is performed by the own vehicle if the determined traffic density allows a safe change of lane.

10 Claims, 1 Drawing Sheet

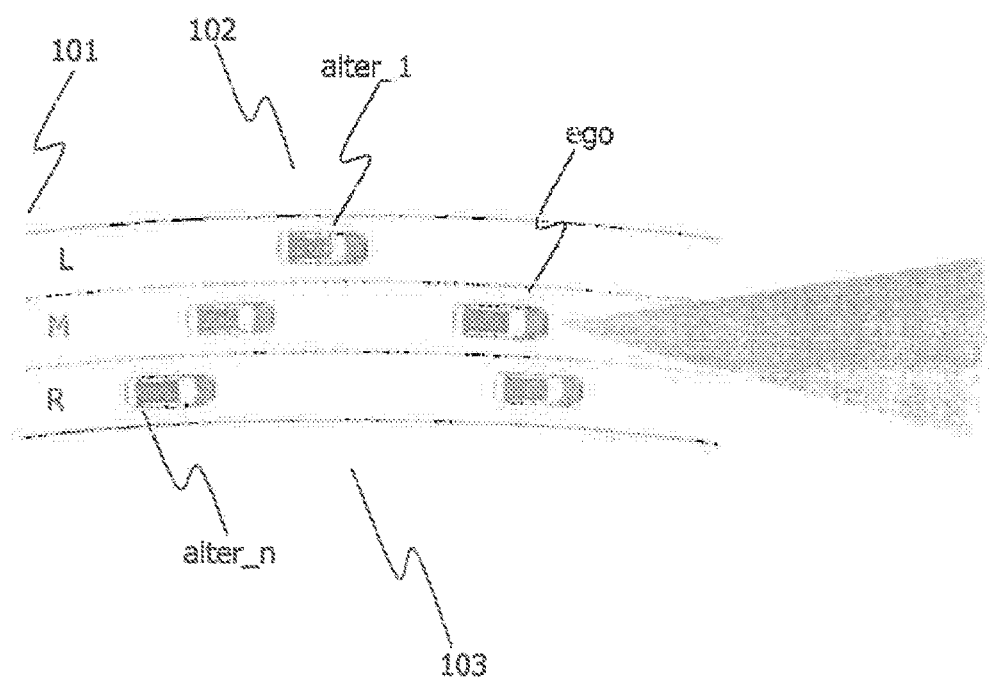

CONTROL SYSTEM AND METHOD FOR DETERMINING A SAFE LANE CHANGE BY VEHICLES

BACKGROUND TO THE INVENTION

A control system and a method for determining a safe lane change by vehicles are disclosed here. This system and method are based in particular on an environmental sensor system in vehicles and support the driver in performing safe lane changes of a vehicle, for example for overtaking manoeuvres of the vehicle. In autonomously controlled vehicles, it increases the safety of the occupants of the vehicle.

PRIOR ART

Current driver assistance systems (ADAS—advanced driver assistance system) offer a plurality of monitoring and hint functions in vehicles, in order to make the driving of a vehicle safer. In this regard the environment of the vehicle is monitored on the basis of environmental data obtained from one or several environmental sensors disposed on the vehicle with respect to the journey progress of the own vehicle.

Known driver assistance systems monitor, for example, whether the vehicle is located within a lane and whether the driver drifts unintentionally to one side of the lane or is on the point of leaving it. Even so-called "blind spot monitors" belong to current driver assistance systems. These determine, for example by means of radar, lidar, video or the like, whether another vehicle, road user or object is located to the side of and/or behind the vehicle, so that a collision could occur when changing lanes or turning off.

In vehicles driven by persons, these systems mostly offer a hint function, to warn the driver of a critical situation or a corresponding manoeuvre. The driver assistance systems can likewise be applied even in autonomously controlled vehicles, in order to provide the autonomous controller with the corresponding environmental data.

UNDERLYING PROBLEM

On roads with several lanes in one driving direction, a lane change from a "slower" lane to a lane with faster vehicles can have fatal consequences if the traffic behind is not judged correctly or is not recognised correctly. A lane change from the "slower" lane, for example to an overtaking lane (thus from the right to the left lane e.g. in continental Europe or the USA), often means that another vehicle ahead of the own vehicle must be observed and at the same time the speed of the following traffic in the overtaking lane must be estimated. In Germany in particular, high speed differences can exist between the vehicle ahead (and the own vehicle) and a following vehicle in the overtaking lane. A speed difference of 100 km/h is not uncommon here.

Due to the speed differences, the traffic behind can be judged incorrectly. Even driver assistance systems have problems here, as they generally detect another vehicle too late on account of its speed or recognise a possible collision with this vehicle too late.

PROPOSED SOLUTION

A control system which is adapted and intended for application in a vehicle or motor vehicle detects following vehicles on the basis of environmental data obtained from one or several environmental sensors disposed on the vehicle. To this end the environmental sensors are adapted to provide an electronic controller (ECU) of the control system with the environmental data reflecting the area in front of, laterally next to and/or behind the vehicle. The control system is adapted and intended at least to detect one or several other vehicles participating in the traffic behind the own vehicle with the environmental sensors. The control system is adapted and intended at least to detect a lane associated with any other vehicle, in which the other vehicle(s) is/are driving. The control system is adapted and intended at least to determine a traffic density of the own lane and/or the adjacent lane. Based on the traffic density determined, the control system is adapted and intended at least to (i) output an indication on a safe or unsafe lane change to a specific of the at least one adjacent lane and/or (ii) to perform an autonomous lane change to the specific of the at least one adjacent lane by the own vehicle if the traffic density determined permits a safe lane change.

In conventional environmental and assistance systems, only other vehicles that are located in an area behind the own vehicle are detected. If applicable, a speed between another vehicle and the own vehicle is additionally determined. Based on the position of the other vehicle and/or the speed difference between the other vehicle and the own vehicle, indications are output, which inform the driver of the own vehicle about the presence of the other vehicle or an approach of the other vehicle to the own vehicle. Specific information on whether a lane change of the own vehicle can lead to a dangerous situation with the other vehicle, is not offered to the driver of the own vehicle in conventional systems.

The solution presented here is suitable in particular for situations in which the driver of the own vehicle wishes to perform a lane change. If he should judge the following traffic incorrectly or fail to see another vehicle by looking in the rear view mirror(s), he is better informed by the present control system and/or warned of a dangerous situation. Even in autonomously controlled vehicles, autonomously performed lane changes, such as overtaking manoeuvres, become safer.

OTHER ADAPTATIONS AND ADVANTAGEOUS DEVELOPMENTS

The control system can be adapted and intended to detect the other vehicle(s) during a predetermined period of time or continuously and to detect the lane associated with the other vehicle(s). The control system can then determine the traffic density and detect the driving situation of the own vehicle and the other vehicle(s) over the time and evaluate it with regard to a safe operation, with the aim of determining the point in time after which the safe lane change is possible.

The detection of one or several other vehicles during a predetermined period of time permits a trend in the traffic situation to be determined. For example, the control system can be adapted and intended to monitor the traffic density with a view to whether the traffic density of one or several lanes increases or decreases. With reference to this trend (this development) the control system can determine a (possibly also future) point in time, after which the lanes very probably have a preferred traffic density for a lane change or overtaking manoeuvre.

Furthermore, the control system can be adapted and intended to compare the traffic density with a threshold value, to rate a lane change as safe if the traffic density exceeds the threshold value and to rate a lane change as unsafe if the traffic density is lower than the threshold value.

To this end the control system is adapted and intended, for example, to determine the traffic density for each of the lanes, and to rate a lane change as safe if the traffic density for each individual lane exceeds the threshold value. The control system can likewise be adapted and intended to rate a lane change as unsafe if at least the traffic density for the adjacent lane is lower than the threshold value. Alternatively, the control system is adapted and intended to determine the traffic density across all lanes and to rate a lane change as safe if the traffic density across all lanes exceeds the threshold value, and/or to rate a lane change as unsafe if the traffic density across all lanes is lower than the threshold value.

The detection of a traffic density offers the advantage that to rate a safe/unsafe lane change, a probability of whether another vehicle can approach the own vehicle with a great speed difference is taken into account. The higher the traffic density, the lower the probability of another vehicle approaching the own vehicle at high speed. If lane changes or overtaking manoeuvres are only performed when there is a higher traffic density, the probability of an accident due to a fast other vehicle not detected by the control system falls.

To this end the control system can further be adapted and intended to determine the traffic density of each of the lanes as a function of a number of other vehicles that are located in the respective lane in a predetermined area behind the own vehicle. Determining the number of other vehicles can be carried out by means of an environmental sensor or a plurality of environmental sensors. By using several environmental sensors that detect an area behind and laterally behind the own vehicle, even several vehicles in the same lane are detected that may be concealed by a first other vehicle and not recognised when using a single sensor.

Another aspect of the proposed solution relates to a control method, which in a vehicle recognises following vehicles based on environmental data obtained from one or several environmental sensors disposed on the vehicle. The method has the following steps:

to provide an electronic controller in the own vehicle by means of the environmental sensors with environmental data reflecting the area in front of, laterally next to and/or behind the vehicle, to detect one or several other vehicles participating in traffic behind the own vehicle with the environmental sensors, to detect a lane associated with each other vehicle, in which the other vehicle(s) drive(s), to determine a traffic density of the own lane and/or of at least one adjacent lane, and on the basis of the determined traffic density (i) to output an indication on a safe or unsafe lane change to a specific of the at least one adjacent lane and/or (ii) to perform an autonomous lane change to the specific of the at least one adjacent lane by the own vehicle if the determined traffic density permits a safe change of lane.

BRIEF DESCRIPTION OF THE DRAWING

Other aims, features, advantages and application options result from the following description of practical examples, which should not be understood as restrictive, with reference to the related drawing. Here all described and/or illustrated features show the object disclosed here by themselves or in any combination, even independently of their grouping in the claims or their references. The dimensions and proportions of the components shown in the FIGURE are not necessarily to scale in this case; they can deviate from what is shown here in embodiments to be implemented.

FIG. 1 shows schematically a driving situation in which an own vehicle drives in a middle lane, while the traffic behind is monitored.

DETAILED DESCRIPTION OF THE DRAWINGS

FIG. 1 shows schematically a driving situation, in which an own vehicle ego (e.g. a motor vehicle) drives in a middle lane M of a multiple-lane, here three-lane, road. Other vehicles are located in the other lanes. The other vehicle alter_1 thus drives in the left-hand lane L, a second other vehicle drives in the middle lane M and a third other vehicle alter_n drives in the right-hand lane R. In the case described here, a normal speed distribution (for continental Europe and the USA, for example) of the vehicles in the respective lanes is assumed, so that the other vehicle alter_1 is faster than the own vehicle ego.

The own vehicle ego has a control system according to the present disclosure with an electronic controller ECU (Electronic Control Unit). For example, by means of the ECU the present control system can at least be adapted and intended to detect one or several other vehicles alter participating in the traffic behind the own vehicle ego using environmental sensors. For example, the ECU receives signals from environmental sensors, processes these signals and associated environmental data and produces control and/or output signals. In FIG. 1, a plurality of areas in the form of segments of a circle are represented around the own vehicle ego, which identify monitoring areas of radar sensors that are not explained further in detail. The radar sensors supply the electronic controller ECU with radar signals about the distance of the other vehicles alter_1 to alter_n. From these, the ECU can, over a specific monitoring period, calculate a difference in speed between the own vehicle ego and the respective other vehicle alter, a travel direction of the other vehicle and if applicable also an angle of rotation of the other vehicle alter about its vertical axis. This information can also be calculated alternatively by the radar sensor and transmitted directly to the ECU.

The environmental sensors continuously detect one or several other vehicles alter participating in the traffic in front of, laterally next to and/or behind the own vehicle ego, in order to determine parameters about the driving situation(s) of the other vehicle(s). These parameters include, for example, the speed, location as a function of time, driving direction of the other vehicle(s).

The control system described here and adapted and intended for use in a vehicle has other environmental sensors as well as or instead of the radar sensor(s), which environmental sensors serve to detect the surroundings of the own vehicle ego and operate using a different technology, such as video, ultrasound, lidar, etc., for example. The electronic controller ECU processes the environmental data obtained from the environmental sensor(s) (radar sensor(s)) disposed on the vehicle to determine whether another vehicle alter is moving relative to the own vehicle ego in a—same or adjacent—lane and what speed or difference in speed from the own vehicle this other vehicle has. To this end the environmental sensors provide the electronic controller ECU with environmental data reflecting the area in front of, laterally next to and/or behind the vehicle.

Furthermore, the control system or the electronic controller ECU can detect a lane associated with any other vehicle alter, in which the other vehicle(s) alter is/are driving. The detection of the respective lane can take place with reference to a lateral distance from the longitudinal axis of the own vehicle ego. The controller ECU can determine this lateral distance by means of a single environmental sensor, for example, which detects the area 101 behind the own vehicle ego. As shown in FIG. 1, a single environmental sensor can only monitor a narrow area 101 directly behind the vehicle and output corresponding signals about another vehicle alter located therein. Vehicles that are located completely in this narrow area 101 can be identified as vehicles that are located in the same lane M as the own vehicle ego.

Alternatively or in addition, the controller ECU can determine the lateral distance also using a single environmental sensor, which monitors an area 102, 103 laterally behind the own vehicle ego. If this is the environmental sensor that monitors an area 102 located to the left side behind the own vehicle ego, a left-hand lane L can be detected as the lane associated with another vehicle alter. By determining the lateral distance from the own vehicle ego, a lane associated with another vehicle alter can be identified even in the case of several adjacent lanes. To this end a threshold value depending on a predetermined lane width can also be used to detect the respective lane of another vehicle alter in a comparison of the lateral distance with the threshold value.

Likewise alternatively or in addition, the controller ECU can determine the lateral distance of another vehicle alter from the own vehicle ego also using several environmental sensors, for example by means of one or several sensors for a rear area 101 and one or several sensors for at least one lateral area 102, 103 of the own vehicle ego. By detecting another vehicle alter using several sensors, both the position and the associated lane of this other vehicle alter can be detected.

Furthermore, the controller ECU can determine a traffic density of the own lane M and/or at least one adjacent lane L, R. After the associated lane has been determined for each further other vehicle alter participating in the traffic, the traffic density of each lane or across all lanes can be determined. The traffic density of a lane can mean in the simplest case that one or several vehicle(s) are or are not located in this lane. The traffic density can thus assume the values zero (0) and one (1).

The controller ECU is thus adapted and intended to recognise even empty lanes, thus to determine that no other vehicle is located in a certain lane. This can be calculated additionally with reference to lateral distances of other vehicles alter from one another and/or from the own vehicle ego. Even distances between objects in and/or next to the lanes and other vehicles alter and/or the own vehicle ego can be evaluated to detect all lanes. In this case a predetermined threshold value, which corresponds to a width of a lane, can again be used when determining the position of the individual lanes.

If the traffic density of the own lane and/or of at least one adjacent lane due to other vehicles has been determined, the control system or the controller ECU can, based on the traffic density determined, (i) output an indication on a safe or unsafe lane change to a specific of the at least one adjacent lane and/or (ii) perform an autonomous lane change to the specific of the at least one adjacent lane by the own vehicle ego if the determined traffic density permits a safe lane change.

The indication on a safe/unsafe lane change can be displayed to the driver of the own vehicle ego, for example, in a display in the dashboard, in a rear-view mirror (inside as well as external mirror) and/or by means of a projection onto the rear windscreen and/or the front windscreen of the vehicle by suitable symbols. Alternatively or in addition, the indication can also be output acoustically or haptically.

The control system is further adapted and intended to detect the other vehicle(s) alter during a predetermined time period or continuously, to detect the lane associated with the other vehicle(s) alter and to determine the traffic density. In this case the driving situation of the own vehicle ego and of the other vehicle(s) alter can be detected over the time and evaluated in regard to a safe operation, with the aim of determining the point in time after which a safe lane change is possible. The predetermined time period can be set as a function of the speed of the own vehicle ego. For example, a larger time period can be selected as the speed of the own vehicle ego increases, in order to better avoid risky situations due to the higher speed.

In another adaptation, the control system is adapted and intended to compare the traffic density with a threshold value, to rate a lane change as safe when the traffic density exceeds the threshold value and to rate a lane change as unsafe and/or output an indication, as shown above, if the traffic density is lower than the threshold value.

To determine the traffic density, the controller ECU evaluates the number of other vehicles alter per predetermined section. Environmental sensors normally have a maximum detection range, thus a maximum distance at which vehicles and/or objects can be recognised. This maximum recognition distance can be 300 m for some systems. The predetermined section can therefore be predefined by the controller ECU as this maximum detection distance. Alternatively, the controller ECU can choose the predefined section as a function of the speed of the own vehicle ego or as a function of one or several differences in speed from other vehicles alter. The traffic density is then determined on the basis of the number of other vehicles alter detected behind the own vehicle ego. The traffic density is calculated, for example, by dividing the number of detected vehicles by the predefined section and/or by the number of lanes.

The controller ECU now compares the calculated traffic density with a threshold value. This threshold value can be a predetermined threshold value, which is stored as a function of the respectively calculated traffic density and in a manner accessible to the controller ECU. The threshold value characterises a traffic density above which (as the traffic density increases) the lanes L, R lying next to the own vehicle ego are rated as safe. This has the background in particular that the traffic in lanes mostly has ever smaller differences in speed between the own vehicle ego and the other vehicles alter as the traffic density increases. Due to the smaller differences in speed, the lanes L, R lying next to the own vehicle ego and a lane change connected with these are safer. In low traffic density, it can be easy for another vehicle alter to approach the own vehicle ego with a high difference in speed. In this case the lanes next to the own vehicle ego must be rated as unsafe. This also applies to the case that the fast other vehicle alter has not yet even been detected by any of the environmental sensors.

In addition or alternatively, the control system can be adapted and intended to determine the traffic density for each of the lanes, and to rate a lane change as safe if the traffic density for each individual lane exceeds the threshold value, and/or rate a lane change as unsafe if at least the traffic density for the adjacent lane is lower than the threshold value. To this end the traffic density is calculated by dividing the number of other vehicles alter in a certain lane within the predetermined section described above by the predetermined section. In this case also the traffic density is compared with a corresponding threshold value and the respective lane rated as safe or unsafe. A lane is considered safe in turn if the traffic density is greater than the threshold value, and is considered unsafe if the traffic density is smaller than the threshold value.

Conventional systems determine only a difference in speed from other vehicles alter to warn the driver of the own vehicle ego of such an approaching vehicle. To this end at least one other vehicle alter must be detected by at least one environmental sensor and "observed" over a certain period of time. Otherwise the difference in speed can only be determined very imprecisely. Due to this, however, other vehicles alter are only rated as a risk very late on.

The present control system, on the other hand, offers the advantage of rating a lane as safe or unsafe without explicit detection of a certain vehicle. Thus collisions with vehicles that have a high difference in speed from the own vehicle ego can be avoided—or at any rate reduced, however. Likewise, the present control system can be used in an autonomously driving vehicle to be able safely to perform an autonomous lane change, such as in an autonomous overtaking manoeuvre, for example.

The variants described above and their construction and operating aspects serve only for a better understanding of the structure, mode of operation and attributes; they do not restrict the disclosure to the practical examples, for instance. The FIGURE is partly schematic, wherein substantial attributes and effects are shown in some cases considerably enlarged, in order to clarify the functions, active principles, technical adaptations and features. Each mode of operation, each principle, each technical adaptation and each feature here, which is/are disclosed in the FIGURES or in the text, can be combined freely and in any way with all claims, each feature in the text and in the other FIGURES, other modes of operation, principles, technical adaptations and features that are contained in this disclosure or result from it, so that all conceivable combinations are to be associated with the variants described. Even combinations between all individual implementations in the text, meaning in each section of the description, in the claims and also combinations between different variants in the text, in the claims and in the figures are comprised. Even the claims do not limit the disclosure and thus the combination possibilities of all features shown with one another. All disclosed features are disclosed here explicitly also individually and in combination with all other features.

The invention claimed is:

1. A control system, which is adapted for application in a vehicle and intended to detect following vehicles on the basis of environmental data which are obtained from one or several environmental sensors disposed on the vehicle, wherein the environmental sensors are adapted to provide an electronic controller of the control system with the environmental data which reflect the area in front of, laterally next to and/or behind the vehicle, and wherein the control system is at least adapted and intended
   to detect one or several other vehicles (alter) participating in traffic behind the own vehicle (ego) with the environmental sensors,
   to detect a lane (L, M, R) associated with each other vehicle (alter), in which the other vehicle(s) (alter) drive(s),
   to determine a traffic density of the own lane (L) and/or of at least one adjacent lane (M, R), wherein the traffic density is calculated by dividing a number of the detected one or several other vehicles (alter) by a predefined area of the own lane (L) and/or of at least one adjacent lane (M, R), and/or by dividing the number of the detected one or several other vehicles (alter) by a number of the detected lanes (L, M, R), and
   on the basis of the determined traffic density (i) to output an indication on a safe or unsafe lane change to a specific of the at least one adjacent lane (M, R) and/or (ii) to perform an autonomous lane change to the specific of the at least one adjacent lane (M, R) by the own vehicle (ego) if the determined traffic density allows a safe change of lane.

2. The control system according to claim 1, which is adapted and intended to detect the other vehicle(s) (alter) during a predetermined period of time or continuously, to detect the lane (M, R) associated with the other vehicle(s) (alter) and to determine the traffic density and to detect the driving situation of the own vehicle (ego) and of the other vehicle(s) (alter) over the time and evaluate them in regard to a safe operation with the aim of determining the point in time after which the safe lane change is possible.

3. The control system according to claim 1, which is adapted and intended to compare the traffic density with a threshold value, to rate a lane change as safe if the traffic density exceeds the threshold value and to rate a lane change as unsafe if the traffic density is lower than the threshold value.

4. The control system according to claim 3, which is adapted and intended to determine the traffic density for each of the lanes (L, M, R), and to rate a lane change as safe if the traffic density for each of the lanes (L, M, R) exceeds the threshold value, and/or to rate a lane change as unsafe if at least the traffic density for the adjacent lane (M, R) is lower than the threshold value, or to determine the traffic density across all lanes (L, M, R), and to rate a lane change as safe if the traffic density across all lanes (L, M, R) exceeds the threshold value, and/or to rate a lane change as unsafe if at least the traffic density across all lanes (L, M, R) is lower than the threshold value.

5. The control system according to claim 3, which is adapted and intended to determine the traffic density of each of the lanes (L, M, R) as a function of a number of other vehicles (alter), which are located in the respective lane (L, M, R) in a predetermined area behind the own vehicle (ego).

6. A control method, which in a vehicle is for detecting following vehicles based on environmental data obtained from one or several environmental sensor(s) disposed on the vehicle, with the steps of:
   providing an electronic controller in the own vehicle (ego) by means of the environmental sensors with environmental data reflecting the area in front of, laterally next to and/or behind the vehicle,
   detecting one or several other vehicles (alter) participating in traffic behind the own vehicle (ego) with the environmental sensors,
   detecting a lane (L, M, R) associated with each other vehicle (alter), in which the other vehicle(s) (alter) drive(s),
   determining a traffic density of the own lane (L) and/or of at least one adjacent lane (M, R), wherein the traffic density is calculated by dividing a number of the detected one or several other vehicles (alter) by a predefined area of the own lane (L) and/or of at least one adjacent lane (M, R), and/or by dividing the number of the detected one or several other vehicles (alter) by a number of the detected lanes (L, M, R), and
   on the basis of the determined traffic density (i) outputting an indication on a safe or unsafe lane change to a specific of the at least one adjacent lane (M, R) and/or (ii) performing an autonomous lane change to the specific of the at least one adjacent lane (M, R) by the own vehicle (ego) if the determined traffic density permits a safe change of lane.

7. The control method according to claim 6, wherein detection of the other vehicle(s) (alter), the detection of the lane (M, R) associated with each other vehicle (alter) and the determination of the traffic density take place during a predetermined period of time or continuously, with the step of:
    detecting the driving situation of the own vehicle (ego) and of the other vehicle(s) (alter) over the time and evaluate them in relation to its safe operation, with the aim of determining the point in time after which the safe lane change is possible.

8. The control method according to claim 6, with the steps of:
    comparing the traffic density with a threshold value, and rating a lane change as safe if the traffic density exceeds the threshold value and rating a lane change as unsafe if the traffic density is lower than the threshold value.

9. The control method according to claim 8, wherein the traffic density is determined for each of the lanes (L, M, R), and a lane change is rated as safe if the traffic density for each individual lane (L, M, R) exceeds the threshold value, and/or a lane change is rated as unsafe if at least the traffic density for the corresponding adjacent lane (M, R) is lower than the threshold value, or the traffic density is determined across all lanes (L, M, R), and a lane change is rated as safe if the traffic density across all lanes (L, M, R) exceeds the threshold value, and/or a lane change is rated as unsafe if the traffic density across all lanes (L, M, R) is lower than the threshold value.

10. The control method according to claim 8, wherein the traffic density of each of the lanes (L, M, R) is determined as a function of a number of other vehicles (alter), which are located in the respective lane (L, M, R) in a predetermined area behind the own vehicle (ego).

* * * * *